United States Patent
Kaiser et al.

(10) Patent No.: US 8,680,397 B2
(45) Date of Patent: *Mar. 25, 2014

(54) ATTRITION-RESISTANT HIGH TEMPERATURE INSULATED WIRES AND METHODS FOR THE MAKING THEREOF

(75) Inventors: Mark Kaiser, Prospect Heights, IL (US); Devlin M. Gualtieri, Ledgewood, NJ (US); Mariola Jolanta Proszowski, Des Plaines, IL (US); Alexander Bershitsky, Northbrook, IL (US)

(73) Assignee: Honeywell International Inc., Morristown, NJ (US)

( * ) Notice: Subject to any disclaimer, the term of this patent is extended or adjusted under 35 U.S.C. 154(b) by 698 days.

This patent is subject to a terminal disclaimer.

(21) Appl. No.: 12/263,856

(22) Filed: Nov. 3, 2008

(65) Prior Publication Data

US 2010/0108353 A1    May 6, 2010

(51) Int. Cl.
*H01B 3/44* (2006.01)
(52) U.S. Cl.
USPC ........................................................ 174/110 R
(58) Field of Classification Search
USPC ........................................... 174/110 R, 120 R
See application file for complete search history.

(56) References Cited

U.S. PATENT DOCUMENTS

| | | |
|---|---|---|
| 2,421,652 A | 6/1947 | Robinson et al. |
| 2,707,703 A | 5/1955 | Dorst |
| 2,975,078 A | 3/1961 | Rayfield |
| 2,984,590 A | 5/1961 | Anderson |
| 3,089,787 A | 5/1963 | Sattler |
| 3,093,511 A | 6/1963 | Weisel et al. |
| 3,222,219 A | 12/1965 | Saunders et al. |
| 3,291,638 A | 12/1966 | Stadlen et al. |
| 3,343,984 A | 9/1967 | Saums et al. |
| 3,352,009 A | 11/1967 | Cohn et al. |
| 3,565,685 A | 2/1971 | Suzuki |
| 4,342,814 A | 8/1982 | Usuki et al. |
| 4,350,738 A | 9/1982 | Saunders et al. |
| 4,429,007 A | 1/1984 | Bich et al. |
| 4,476,192 A | 10/1984 | Imai et al. |
| 4,693,936 A | 9/1987 | McGregor et al. |
| 4,716,079 A | 12/1987 | Sano et al. |
| 4,913,964 A * | 4/1990 | Fujii et al. ...................... 428/379 |
| 5,139,820 A | 8/1992 | Sawada et al. |
| 5,154,954 A | 10/1992 | Croop et al. |

(Continued)

FOREIGN PATENT DOCUMENTS

| | | |
|---|---|---|
| CN | 1760994 | 4/2006 |
| EP | 0460238 A1 | 12/1991 |

(Continued)

OTHER PUBLICATIONS

EP Search Report, EP 09174371.6-1218 dated Feb. 18, 2010.

(Continued)

*Primary Examiner* — Chau Nguyen
(74) *Attorney, Agent, or Firm* — Ingrassia Fisher & Lorenz, P.C.

(57) ABSTRACT

Methods are provided for producing an attrition-resistant, flexible, insulated wire well-suited for use in a high temperature operating environment. In one embodiment, the method includes the steps of providing a conductor, preparing a dielectric coating, applying the dielectric coating over the conductor, and curing the coated conductor. The dielectric coating includes an organic binder, a dielectric material, and an inorganic lubricant.

16 Claims, 4 Drawing Sheets

(56) References Cited

U.S. PATENT DOCUMENTS

| | | | |
|---|---|---|---|
| 5,260,104 | A | 11/1993 | Bryant et al. |
| 5,350,638 | A | 9/1994 | Sawada et al. |
| 5,393,612 | A | 2/1995 | Matsuura et al. |
| 5,425,992 | A | 6/1995 | Tachikawa et al. |
| 5,902,681 | A | 5/1999 | Ueoka et al. |
| 6,319,604 | B1 | 11/2001 | Xu |
| 6,403,890 | B1 * | 6/2002 | McGregor et al. ........ 174/120 R |
| 6,407,339 | B1 | 6/2002 | Rice et al. |
| 6,797,200 | B2 | 9/2004 | Scelza et al. |
| 6,906,258 | B2 * | 6/2005 | Hirai et al. ................ 174/36 |
| 7,253,357 | B2 * | 8/2007 | Cipelli et al. .............. 174/36 |
| 7,795,538 | B2 * | 9/2010 | Kaiser et al. ............ 174/110 R |
| 2002/0041960 | A1 | 4/2002 | Fournier et al. |
| 2002/0192511 | A1 | 12/2002 | Hruschka et al. |
| 2007/0135538 | A1 * | 6/2007 | Ihara et al. ................. 524/106 |
| 2007/0151743 | A1 | 7/2007 | Murray et al. |
| 2007/0237955 | A1 | 10/2007 | Favereau et al. |
| 2007/0299181 | A1 * | 12/2007 | Nakata et al. .............. 524/394 |
| 2008/0015122 | A1 * | 1/2008 | Student et al. ............. 508/155 |
| 2008/0176968 | A1 * | 7/2008 | VanSumeren et al. .......... 521/97 |

FOREIGN PATENT DOCUMENTS

| | | |
|---|---|---|
| EP | 2058823 A1 | 5/2009 |
| JP | 6193510 | 5/1986 |
| JP | 07500942 A | 1/1995 |
| JP | 09087553 A | 3/1997 |
| WO | 9304485 A1 | 3/1993 |

OTHER PUBLICATIONS

Kaiser, M. et al.; Flexible Insulated Wires for Use in High Temperatures and Methods of Manufacturing, filed with the USPTO on Nov. 6, 2007, pp. 1-12 including 2 sheets of drawings and assigned U.S. Appl. No. 11/935,762.

JP Office Action for application No. 2009-250493 dated Dec. 10, 2013.

* cited by examiner

FIG. 8 ated wires.

ATTRITION-RESISTANT HIGH TEMPERATURE INSULATED WIRES AND METHODS FOR THE MAKING THEREOF

TECHNICAL FIELD

The present invention relates generally to insulated wires and, more particularly, to insulated wires having flexible, attrition-resistant coatings well-suited for use within high temperature environments, as well as to methods for forming such wires.

BACKGROUND

Many electromagnetic devices, including various sensors (e.g., linear variable differential transducers), motors, and actuators (e.g., solenoids) employ one or more coils of insulated wires. Each insulated wire typically includes at least one elongated conductor sheathed within an insulative coating. The elongated conductor is typically formed from an electrically conductive alloy or pure metal, such as nickel, copper, aluminum, or silver. The insulative coating is commonly formed from a dielectric material, such as polyimide, polytetrafluoroethylene, (e.g., Teflon®), and polyvinyl chloride (PVC). During manufacture, the dielectric material may be applied to the elongated conductor via a spraying, drawing, or electrolytic coating processes. After application of the dielectric material, the coated wire may then be cured and formed into a desired shape (e.g., wound into a coil shape).

Although well-suited for use in a variety of applications, many conventional insulated wires are unsuitable for use in high temperature operating environments (e.g., exceeding 240° C.) due to working temperature limitations of the insulative coating. Polyimide insulated wires, for example, are relatively inexpensive and simple to manufacture, but have a maximum continuous working temperature limit of about 240° C. Similarly, Teflon® has a maximum continuous working temperature limit of approximately 260° C. In addition, the utilization of Teflon® and other similar dielectric materials may result in an undesirable increase overall wire thickness and cost.

The temperature stability of insulated wires may be increased by utilizing certain other dielectric materials to form the insulative coating; however, these alternative materials are also limited in various respects. For example, silicon oxides may be utilized to form an insulative coating that is more resistant to high temperature operating conditions; however, silicon oxide insulated wires are relatively inflexible, which renders such wires difficult to utilized in electromagnetic devices wherein the wires need to be bent, coiled, or otherwise formed after application and curing of the insulative coating. This is especially true for coiled-wire devices (e.g., sensors, motors, and actuators) of the type described above. With respect to such coiled-wire devices, the maximum operating temperature of the insulated wire may be increased by utilizing an alternative manufacturing technique wherein the elongated conductor is first wound into a coil, a dielectric coating is applied over the wound wire, and the entire assembly is subsequently cured. Such post-winding cure procedures are, however, undesirably costly and time consuming. Furthermore, to reliably implement such post-winding cure procedures, the entire electronic assembly (e.g., circuit boards, sensors, etc.) must be able to withstand exposure to high cure temperatures, which may exceed the operational limit of other components.

Considering the above, it is desirable to provide an insulated wire suitable for use within high temperature environments that is sufficiently flexible to be formed into a desired shape (e.g., a coil) subsequent to application and curing of the dielectric coating. It is further desirable for such an insulated wire to resist attrition of its insulative coating due to self-abrasion that may otherwise occur in applications wherein the wire is wound into a multi-turn coil. Lastly, it is desirable to provide methods for producing such an insulated wire that are relatively inexpensive and straightforward to implement. Other desirable features and characteristics of the present invention will become apparent from the subsequent detailed description of the invention and the appended claims, taken in conjunction with the accompanying drawings and this background of the invention.

BRIEF SUMMARY

Methods are provided for producing an attrition-resistant, flexible, insulated wire well-suited for use in a high temperature operating environment. In one embodiment, the method includes the steps of providing a conductor, preparing a dielectric coating, applying the dielectric coating over the conductor, and curing the coated conductor. The dielectric coating includes an organic binder, a dielectric material, and an inorganic lubricant.

Attrition-resistant, flexible, insulated wires well-suited for use in high temperature operating environments are further provided. In one embodiment, the insulated wire includes an elongated conductor and an insulative coating disposed over the elongated conductor. The insulative coating is formulated from a dielectric material, an inorganic lubricant, and an organic binder having an organic component. The organic component has been substantially decomposed from the coating during manufacture of the insulated wire.

BRIEF DESCRIPTION OF THE DRAWINGS

At least one example of the present invention will hereinafter be described in conjunction with the following figures, wherein like numerals denote like elements, and.

DETAILED DESCRIPTION

The following Detailed Description is merely exemplary in nature and is not intended to limit the invention or the application and uses of the invention. Furthermore, there is no intention to be bound by any theory presented in the preceding Background or the following Detailed Description.

Figure 1:
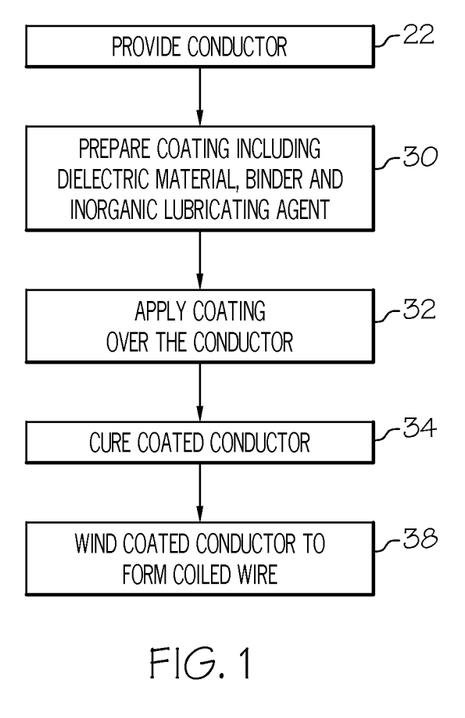
FIG. 1 is a flow chart illustrating a first exemplary process suitable for producing an attrition-resistant, flexible, insulated wire.
Figure 2:
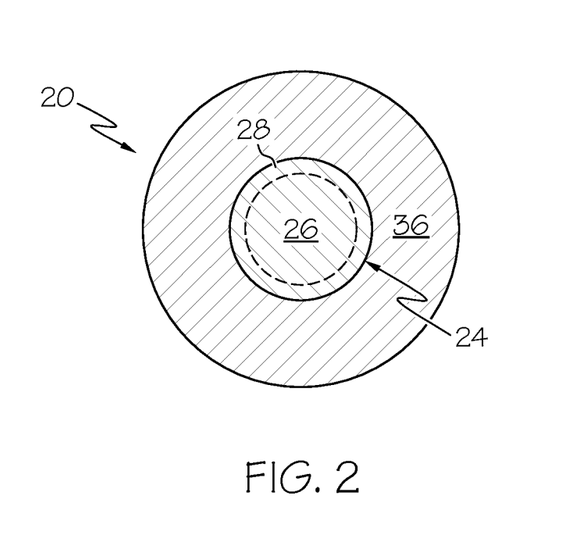
FIG. 2 is a generalized cross-sectional view of an exemplary insulated wire that may be produced utilizing the exemplary process illustrated in FIG. 1.

FIG. 1 is a flowchart illustrating a first exemplary process suitable for producing an attrition-resistant, flexible, insulated wire; and FIG. 2 is a generalized cross-sectional view of an insulated wire 20 that may be produced utilizing the exemplary process illustrated in FIG. 1. To commence (STEP 22), an elongated conductor is provided, such as conductor 24 shown in FIG. 2. Conductor 24 may be formed from a wide variety of conductive materials, including various metals and alloys. A non-exhaustive list of suitable conductive materials includes nickel, copper, aluminum, stainless steel, silver, and alloys thereof. In a preferred group of embodiments, and as indicated in FIG. 2, conductor 24 includes a main body 26 and an outer shell 28 formed from first and second conductive materials, respectively. In this case, the first conductive material may have a higher conductivity and a lower melting point than does the second conductive material; e.g., the first material may comprise copper, and the second material may comprise nickel. This example notwithstanding, conductor 24 may assume various other structural forms and may be formed from various other combinations of conductive materials. In addition, although shown and described herein as including a single conductor, embodiments of the insulated wire (e.g., insulated wire 20 shown in FIG. 2) may include multiple conductors.

During STEP 22, one or more sub-steps may be performed to better prepare the elongated conductor for subsequent fabrication steps. For example, during STEP 22, the elongated conductor may be cleaned; e.g., treated with a degreasing agent to remove any grease or oils present on the conductor's outer surface. After cleaning, the elongated conductor may be subjected to a calcination process (e.g., exposure to temperatures of approximately 600° C. for a predetermined period of time) to form an oxide shell on the conductor's exterior surface. If, for example, a nickel or nickel-based conductor is utilized, calcination results in the formation of a nickel oxide shell about the conductor's outer surface.

Next, at STEP 30, a dielectric coating is prepared. In this particular example, the dielectric coating includes at least three main components: (i) a dielectric material, (ii) a binder, and (iii) an inorganic lubricant. As utilized herein, the term "dielectric material" is defined broadly to include dielectric material or dielectric-forming materials; i.e., materials that form dielectrics when subjected to the process steps described herein. The selected dielectric material may comprise various materials having desirable insulative properties, preferably having a dielectric constant dielectric constant (K) less than ten (10), and more preferably having a dielectric constant dielectric constant (K) less than three (3), after curing. The selected dielectric materials should be capable of insulating the elongated conductor in high temperature operating environments exceeding, for example, 240° C. Suitable dielectric materials include, but are not limited to, alumina, silica, silica aluminate, and other inorganic oxides. These examples notwithstanding, the selected dielectric material preferably comprises zeolite.

Also, during STEP 30, an organic binder is selected. In a preferred group of embodiments, the selected binder comprises an organic component that can be substantially or completely decomposed when subjected to heat-treatment (e.g., calcination). In this case, the organic component may include at least one polymeric component with an oxygen atom. Suitable organic components include various polyolefins, such as polyvinyl alcohol and polyethylene oxide. In a preferred embodiment, the selected binder comprises an aqueous polymer blend of polyvinyl alcohol and polyethylene; e.g., water, polyvinyl alcohol, and polyethylene oxide may be present at a level of about 15% polymer by weight. Aqueous binders are generally preferred for their ability to leave little to no organic residue after calcination, for their ease of application, and for their environmentally friendly characteristics; however, other organic binders (e.g., non-aqueous polymer blends) may also be employed, such as paraffin waxes dissolved in appropriate organic solvents (e.g., acetone and toluene).

With continued reference to the exemplary process illustrated in FIG. 1, an inorganic lubricant is further selected during STEP 30. In one group of embodiments, the inorganic lubricant comprises an inorganic material that is substantially insulative. In a preferred group of embodiments, the inorganic lubricant comprises one or more nitrides, such as aluminum nitride, silicon nitride, titanium nitride, and/or boron nitride. In a still more preferred embodiment, the inorganic lubricant comprises boron nitride added to the dielectric material and binder in a quantity of approximately 10% to 0.01%, and more preferably approximately 1% to 0.1%, by weight of the dielectric material (e.g., zeolite). Advantageously, the addition of an inorganic lubricant to the insulative coating increases the lubricity thereof and, in so doing, decreases the likelihood of attrition due to self-abrasion. The resulting insulated wire (e.g., wire 20 shown in FIG. 2) is consequently well-suited for winding and, thus, ideal for use in coiled-wire devices such as those described below in conjunction with FIGS. 5-8.

The dielectric material, the organic binder, and the inorganic lubricant selected during STEP 30 may be combined into a mixture or slurry in any suitable manner. After being combined into a slurry, the slurry is preferably manipulated to obtain a desired range of particle sizes and/or a uniform consistency. In these regards, the slurry may be milled, mixed, or blended; however, it is generally preferred that the slurry be milled, such as with a ball mill, in order to achieve a substantially uniform particle size.

After preparation of the dielectric coating (STEP 30), the dielectric coating is applied over the elongated conductor (STEP 32). Application may involve spraying, brushing, slurry coating, and dip or draw coating processes. It is preferred, although by no means necessary, that the entirety of the elongated conductor's outer circumferential surface is covered with the dielectric coating to create a tubular insulative sheathing that is generally co-axial with the elongated conductor. The thickness to which the dielectric slurry is deposited may depend upon desired insulative properties, conductor gauge, intended application, and other such criteria. As a non-limiting example, if the conductor has a diameter of approximately 0.127 mm (5 mils), the dielectric coating may be deposited to a thickness of approximately 0.0381 mm (1.5 mils) thereby resulting in an overall increase in the insulated wire's diameter of 0.0762 mm (3 mils). If the dielectric coating includes an aqueous polymer blend of the type described above, the coated conductor may be dried (e.g., by exposure to a heated air stream) to remove substantially all of the water from the dielectric coating.

Next, at STEP 34, the coated conductor is cured. Curing may entail exposure to an elevated temperature for a period of time sufficient to substantially decompose the organic component included within the outer surface of the dielectric coating. For example, the coated conductor may be exposed to temperatures of approximately 400° C. to 1000° C. for approximately 2 to 10 hours and, more specifically, to temperatures of approximately 600° C. to 950° C. for approximately 4 to 6 hours. As shown in FIG. 2, this results in a dielectric coating 36 formed over and around elongated conductor 26. Notably, dielectric coating 36 is flexible (e.g., may be bent without concern of the creation of micro-fissures in the heat-treated dielectric material) and is capable of insulating conductor 26 even when subjected to elevated temperatures (e.g., exceeding 240° C.). Without intending to be bound by theory, heat-treatment of the coated conductor is believed to cause decomposition of dielectric slurry and the release of gaseous organic byproducts, such as carbon dioxide and/or carbon monoxide. The release of these gaseous organic byproducts leaves the inorganic material, from the slurry, on the conductor. This, in turn, permits the inorganic material to interface with the surface oxide of the conductor while removing carbon from the dielectric coating thus improving the insulative proprieties thereof.

Lastly, during STEP 38, the insulated wire is formed into a desired shape; e.g., wound into a coil. The final step of the exemplary process illustrated in FIG. 1 (i.e., STEP 38) need not be performed in alternative embodiments; however, STEP 38 is included to emphasize that the insulated wire formed via STEPS 22, 30, 32, and 34 may readily be formed into a desired shape (e.g., wound into a coil) due to its superior flexibility and resistance to attrition due to self-abrasion. Furthermore, the dielectric coating of the insulated wire is fully formed and cured prior to winding. The insulated wire thus does not require post-winding curing. Nor does the insulated wire require post-winding application of additional dielectric coatings; however, it will be appreciated by the skilled practitioner that an environmental encapsulant may be applied over the insulated wire after winding, if desired.

Figure 3:
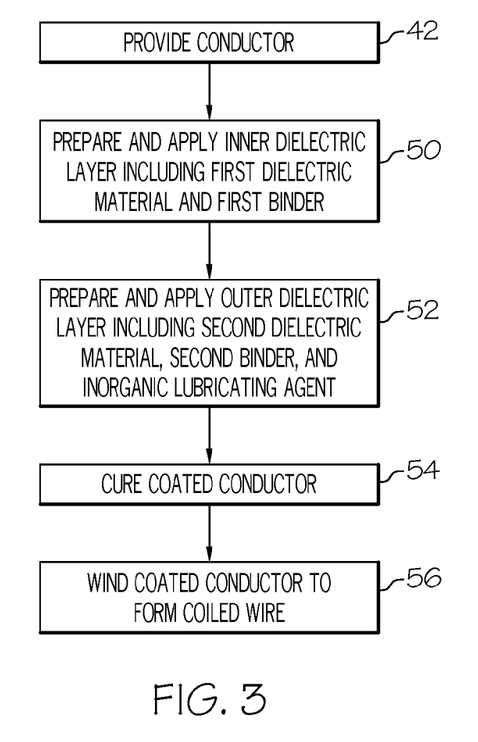
FIG. 3 is a flow chart illustrating a second exemplary process suitable for producing an attrition-resistant, flexible, insulated wire.
Figure 4:
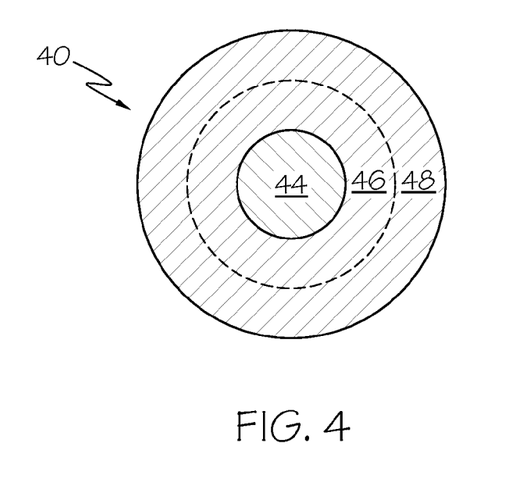
FIG. 4 is a generalized cross-sectional view of an exemplary insulated wire that may be produced utilizing the exemplary process illustrated in FIG. 3.

FIG. 3 is a flowchart illustrating a second exemplary process suitable for producing an attrition-resistant, flexible, insulated wire; and FIG. 4 is a generalized cross-sectional view of an insulated wire 40 that may be produced utilizing the exemplary process illustrated in FIG. 3. The second exemplary process illustrated in FIG. 3 is similar to the first exemplary process described above in conjunction with FIG. 1. For example, at STEP 42, the second exemplary process commences with the provision of an elongated conductor (e.g., conductor 44 shown in FIG. 4). As explained above in conjunction with STEP 22 (FIG. 1), the step of providing an elongated conductor may include various sub-steps, such as the cleaning and heat-treatment of the conductor. Although not shown in FIG. 4 for clarity, conductor 44 may include a main body surrounded by an outer shell (e.g., an oxide) as previously described.

In the second exemplary process illustrated in FIG. 3, and in contrast to the first exemplary process illustrated in FIG. 1, the dielectric coating is applied to the elongated conductor as two separate layers, namely, an inner dielectric layer and an outer dielectric layer as illustrated in FIG. 1 at 46 and 48, respectively. The inner dielectric layer is prepared and applied to the insulated wire's outer circumferential surface during STEP 50. The inner dielectric layer may be prepared and applied in much the same manner as was the dielectric coating described above; e.g., via milling and spraying, brushing, slurry coating, dip or draw coating processes. Furthermore, as was the case previously, the inner dielectric layer includes a dielectric material and an organic binder. However, unlike the above-described dielectric coating, the inner dielectric layer applied during STEP 50 does not include an inorganic lubricant (i.e., the inner dielectric layer is substantially free of an inorganic lubricant). By first applying an inner dielectric layer lacking an inorganic lubricant in this manner, increased adherence may be achieved between the dielectric layer and the elongated conductor's outer surface. Dielectric materials and binders suitable for inclusion within the inner dielectric layer applied during STEP 50 are the same as those previously set-forth.

Next, during STEP 52, an outer dielectric layer is prepared and applied over the inner dielectric layer to form an insulative coating over the conductor. As does the inner dielectric layer, the outer dielectric layer includes a dielectric material and an organic binder. The dielectric material and the binder included within the outer dielectric layer may or may not be the same dielectric material and binder included within the inner dielectric layer applied during STEP 50. The outer dielectric layer applied during STEP 52 further includes an inorganic lubricant of the type discussed above (e.g., boron nitride). The inorganic lubricant may be added to the slurry of dielectric material and binder in the manner and in the quantities discussed above, and the outer dielectric may be applied to the inner dielectric layer utilizing the above-described application processes (e.g., spraying, brushing, slurry coating, draw coating, etc.). In a preferred embodiment, the outer dielectric is applied such that the thickness of the outer dielectric is less than or equal to approximately 50% of the combined thickness of the outer dielectric and the inner dielectric layer; e.g., utilizing the example introduced above wherein the dielectric coating is deposited to a total thickness of 0.0381 mm, the outer dielectric layer and inner dielectric layer may each be deposited to a thickness of approximately 0.0191 mm. In a more preferred embodiment, the outer dielectric layer is applied such that the thickness of the outer dielectric is less than or equal to approximately 25% of the combined thickness of the outer dielectric and the inner dielectric layer; e.g., the outer dielectric may be deposited to a thickness of approximately 0.0100 mm, and the inner dielectric layer may be deposited to a thickness of approximately 0.0286 mm. As a result of this process, the inorganic lubricant is substantially concentrated in an outer annular portion of the dielectric coating. Thus, the inorganic lubricant still improves the lubricity of the dielectric coating's outer surface, and therefore the coating's resistance to attrition due to self-abrasion, without decreasing the adherence between the dielectric coating's inner surface and the outer surface of the elongated conductor.

To complete the second exemplary process, the coated conductor is cured (STEP 54) and, perhaps, wound to form a coil (STEP 56). The steps of curing and winding have been described above in conjunction with the first exemplary process (FIG. 1) and will not be repeated in the interests of concision. However, it is again noted that the insulated wire resulting from the foregoing process steps is flexible and resistant to attrition due to self-abrasion. In addition, the insulative coating included within the above-described wire is capable of maintaining its insulative properties at high working temperatures exceeding, for example, 240° C. As a result, the insulated wire is ideal for utilization in high temperature applications wherein the wire is to be bent into a desired shape (e.g., wound into a coil) after application and curing of the dielectric coating. To further emphasize this point, three exemplary coiled-wire devices employing one or more attrition-resistant, flexible, insulated wires (e.g., wire 20 shown in FIG. 2 and/or wire 40 shown in FIG. 4), will now be described in conjunction with FIGS. 5-8.

Figure 5:
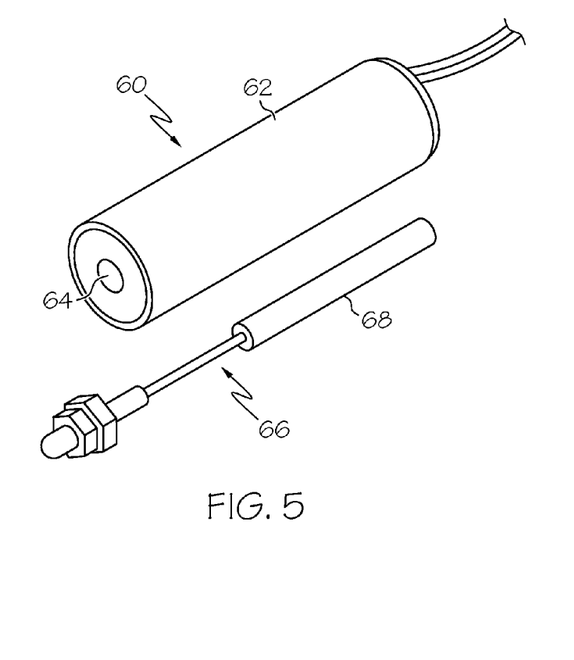
FIGS. 5 and 6 are isometric and cross-sectional views, respectively, of a linear variable differential transformer including wound coils formed from attrition-resistant, flexible, insulated wires such as those shown in FIGS. 2 and 4.
Figure 6:
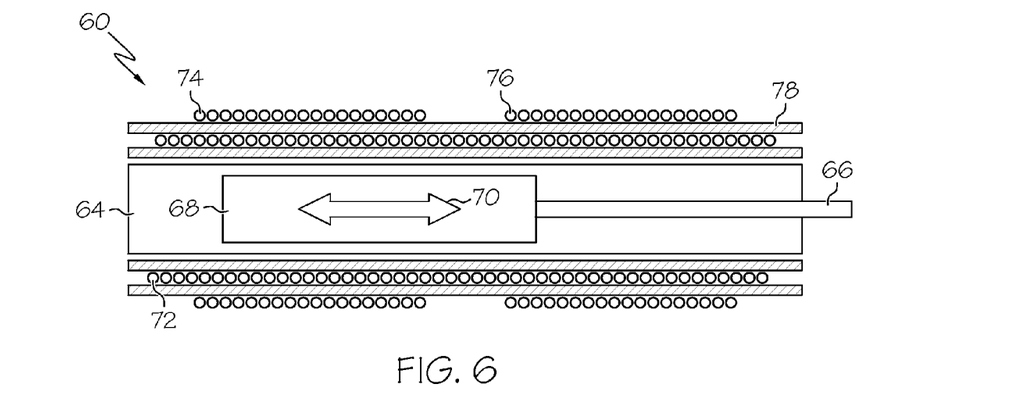

FIGS. 5 and 6 are isometric and simplified cross-sectional views of an exemplary linear variable differential transducer ("LVDT") 60 including at least one winding formed utilizing one or more attrition-resistant, flexible, insulated wires of the type described above. Referring collectively to FIGS. 5 and 6, LVDT 60 includes two main components: (i) a stationary housing 62 having an axial bore 64 formed therein, and (ii) a rod 66 having a magnetically permeable core 68 affixed to one end thereof. Magnetically permeable core 68 may be formed from a nickel-iron composite, titanium, or other such material having a relatively high magnetic permeability. A number of windings are disposed within housing 62. For example, and with reference to FIG. 6, a central or primary winding 72 may be wound around an inner portion of housing 62, and first and second secondary windings 74 and 76 are wound around an outer portion of housing 62. Again, windings 72, 74, and 76 are each formed utilizing insulated wires of the type described above (e.g., insulated wire 20 shown in FIG. 2 and/or insulated wire 40 shown in FIG. 4). In one specific implementation, primary winding 72 preferably assumes the form of a 350-turn coil comprising a single layer of wound wire, and secondary windings 74 and 76 each assume the form of 125-turn coil comprising three layers of wound wire. Windings 74 and 76 may generally circumscribe substantially opposing portions of primary winding 72. As shown in FIG. 6, an insulative body 78 (e.g., ceramic felt) may be disposed between secondary windings 74 and 76 and primary winding 72.

Opposite core 68, rod 66 is fixedly coupled to a translating component, such as a piston valve element (not shown), and translates therewith relative to stationary housing 62. As rod 66 translates in this manner, magnetically permeable core 68 slides axially within bore 64 (indicated in FIG. 6 by double-headed arrow 70). When an alternating current is applied to primary winding 72 (commonly referred to as the "primary excitation"), a differential AC voltage is induced in one or both of secondary windings 74 and 76. The differential AC voltage between secondary windings 74 and 76 varies in relation to the axial movement of magnetically permeable core 68 within axial bore 64. During operation of LVDT 60, electronic circuitry (not shown) associated within LVDT 60 converts the AC output voltage to a suitable current (e.g., high level DC voltage) indicative of the translational position of core 68 within bore 64. The DC voltage may be monitored by a controller (also not shown) to determine the translation position of core 68 and, therefore, the translational position of the movable element (e.g., piston valve element) fixedly coupled to rod 66. Notably, due in part to the utilization of the high temperature insulated wire to form windings 72, 74, and 76, LVDT 60 is well-suited for use in high temperature environments, such as those commonly encountered in avionics applications.

Figure 7:
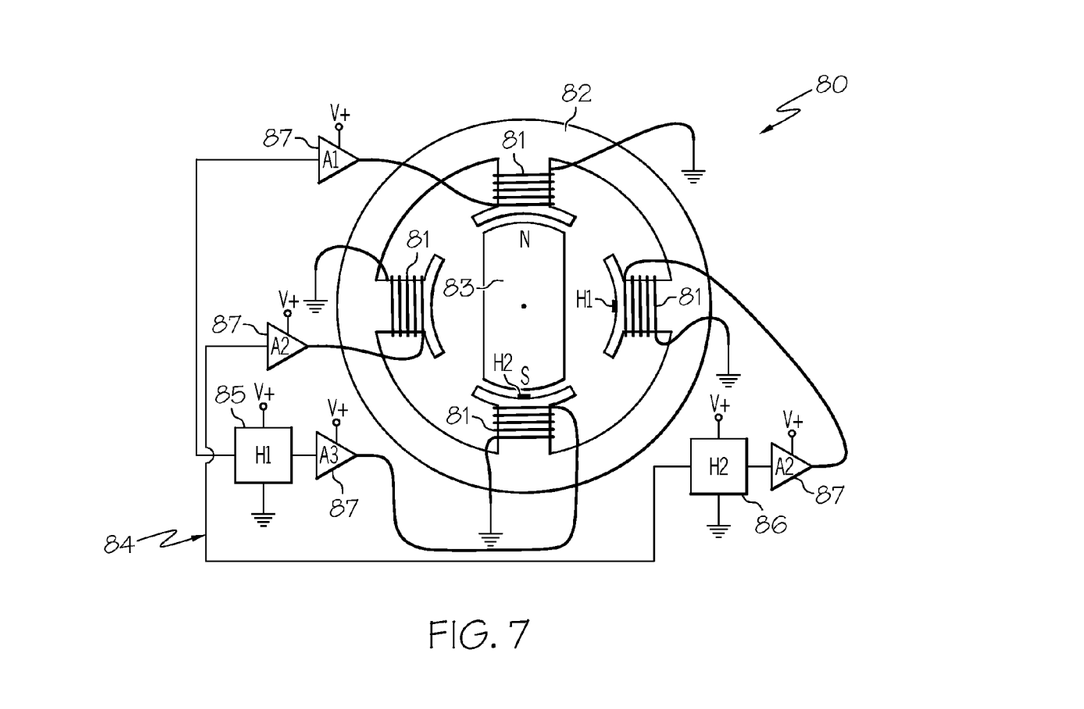
FIG. 7 is a simplified schematic of a brushless DC motor including a wound coil formed from attrition-resistant, flexible, insulated wire such as that shown in FIG. 2 and in FIG. 4.

FIG. 7 is a simplified schematic of a second exemplary electromagnetic device 80, namely a brushless DC motor, which includes several multi-turn coils 81 formed from the attrition-resistant, flexible, insulated wire described above. As will be readily appreciated, brushless DC motor 80 includes a four-armature stator 82, a magnet rotor 83, and a driver circuit 84. Magnet rotor 83 is rotatably mounted within stator 82 and serves as the mechanical output of DC motor 80. Each multi-turn coil 81 is wrapped around a different armature of stator 82 and is electrically coupled to driver circuit 84. For commutation, driver circuit 84 includes a first magnetic field sensor 85, a second magnetic field sensor 86, and four amplifiers 87, which are electrically coupled between Hall effect sensors 85 and 86 and multi-turn coils 81 as shown in FIG. 7. During operation of DC motor 80, driver circuit 84 selectively energizes multi-turn coils 81 in accordance with signals received from magnetic field sensors 85 and 86 and amplified by amplifiers 87 to magnetically drive the rotation of rotor 83 in the well-known manner. Although described above in conjunction with an exemplary brushless DC motor including a permanent magnet rotor, it will be understood that multi-turn coils formed from the wire described above may also be employed in various other types of electric motors including those lacking permanent magnets.

Figure 8:
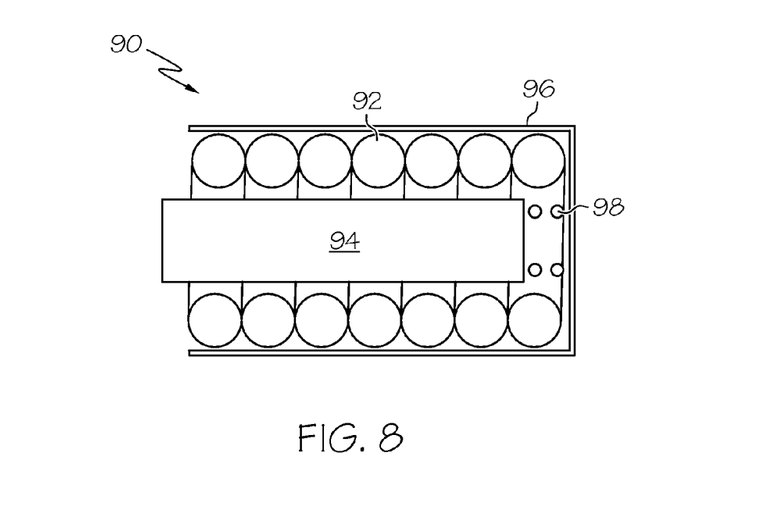
FIG. 8 is a cross-sectional view of a simplified actuator including a wound coil formed from attrition-resistant, flexible, insulated wire such as that shown in FIG. 2 and in FIG. 4.

Lastly, FIG. 8 is a simplified cross-sectional view of a third exemplary electromagnetic device 90 (i.e., a solenoid) including a multi-turn coil 92 formed from the attrition-resistant, flexible, insulated wire described above. As was the case previously, a core 94 is disposed within multi-turn coil 92. Core 94 is configured to translate relative to coil 92 between an extended position and a retracted position (shown). Coil 92 is mounted within a stationary housing 96, and a spring 98 is compressed between an inner wall of housing 96 and an end portion of core 94. Spring 98 thus biases core 94 toward the extended position. When coil 92 is de-energized, spring 98 expands and core 94 moves into the extended position. However, when coil 92 is energized, the magnetic field generated thereby attracts core 94 toward the retracted position (shown). As a result, core 94 moves into the retracted position, and spring 98 is further compressed between core 94 and housing 96.

In view of the above, there has been provided multiple exemplary embodiments of an insulated wire suitable for utilization in high temperature operating environments. Notably, in the above-described exemplary embodiments, the insulated wire is flexible and may be readily bent into a desired shape (e.g., a coil) subsequent to application and curing of the dielectric coating. In addition, the insulated wire is resistant to attrition of its insulative coating due to self-abrasion that may otherwise occur in applications wherein the wire is wound into a coiled shape. There has also been provided multiple exemplary embodiments of a method suitable for producing such an insulated wire that is relatively inexpensive and straightforward to implement.

While at least one exemplary embodiment has been presented in the foregoing Detailed Description, it should be appreciated that a vast number of variations exist. It should also be appreciated that the exemplary embodiment or exemplary embodiments are only examples, and are not intended to limit the scope, applicability, or configuration of the invention in any way. Rather, the foregoing Detailed Description will provide those skilled in the art with a convenient road map for implementing an exemplary embodiment of the invention. It being understood that various changes may be made in the function and arrangement of elements described in an exemplary embodiment without departing from the scope of the invention as set-forth in the appended claims.

What is claimed is:

1. A method for producing an attrition-resistant, flexible, insulated wire well-suited for use in a high temperature operating environment, the method comprising:
    providing a conductor;
    preparing a dielectric coating comprising an organic binder, a dielectric material, and an inorganic lubricant;
    applying the dielectric coating over the conductor; and
    curing the coated conductor by exposing the coated conductor to temperatures between approximately 400° C. and approximately 1000° C. for a period of time between approximately two and approximately ten hours to decompose substantially all organic material from the insulative coating;
    wherein the organic binder comprises an oxygenated polyolefin selected to decompose, in its substantial entirety, during curing of the coated conductor.

2. A method according to claim 1 wherein the step of preparing comprises preparing a dielectric coating comprising an organic binder, a dielectric material, and an inorganic lubricant that is substantially insulative.

3. A method according to claim 1 wherein the step of preparing comprises preparing a dielectric coating comprising an organic binder, a dielectric material, and an inorganic lubricant comprising a nitride selected from the group consisting of aluminum nitride, silicon nitride, titanium nitride, and boron nitride.

4. A method according to claim 1 wherein the step of preparing comprises preparing a dielectric coating comprising an organic binder, a dielectric material, and an inorganic lubricant comprising boron nitride.

5. A method according to claim 4 wherein the step of preparing comprises adding approximately 10% to 0.01% boron nitride, by weight of the dielectric material, to the organic binder and the dielectric material.

6. A method according to claim 5 wherein the step of adding comprises adding approximately 1% to 0.1% boron nitride, by weight of the dielectric material, to the organic binder and the dielectric material.

7. A method according to claim 4 wherein the step of preparing comprises selecting an organic binder comprising an aqueous polymer blend.

8. A method according to claim 4 wherein the step of preparing comprises selecting a dielectric material that has a dielectric constant less than approximately 3 after the step of curing.

9. A method according to claim 1 wherein the step of preparing comprises preparing a dielectric coating comprising an organic binder having an organic component, a dielectric material, and inorganic lubricant, and wherein the step of curing comprises heat-treating the coated conductor to decompose substantially all of the organic component.

10. A method according to claim 9 further comprising the step of forming the coated conductor into a desired shape, the step of forming being performed after the step of heat-treating.

11. A method according to claim 9 further comprising the step of winding the coated conductor into a coil, the step of winding being performed after the step of heat-treating.

12. A method according to claim 1 wherein the oxygenated polyolefin comprises one of the group consisting of a polyvinyl alcohol and a polyethylene oxide.

13. A method for producing an attrition-resistant, flexible, insulated wire well-suited for use in high temperature operating environments, the method comprising:

providing a conductor;

applying an inner dielectric layer to an outer surface of the conductor, the inner dielectric layer comprising a first dielectric material and a first organic binder;

applying an outer dielectric layer over the inner dielectric layer to form a insulative coating over the conductor, the outer dielectric layer comprising a second dielectric material, a second organic binder, and an inorganic lubricant selected from the group consisting of aluminum nitride, silicon nitride, titanium nitride, and boron nitride; and decomposing substantially all organic material from the insulative coating by exposing the coated conductor to temperatures between approximately 400° C. and approximately 1000° C. for a time period between approximately two hours and approximately ten hours;

wherein the first organic binder and the second organic binder from the group consisting of polyvinyl alcohol, polyethylene oxide, and a combination thereof; and wherein selecting the first dielectric material and the second dielectric material from the group consisting of zeolite, silica, alumina, titania, and combinations thereof.

14. A method according to claim 13 wherein the step of applying the outer dielectric layer comprises depositing the outer dielectric layer to a thickness less than or equal to approximately 50% of the combined thickness of the outer dielectric layer and the inner dielectric layer.

15. A method according to claim 14 wherein the step of applying the outer dielectric layer comprises depositing the outer dielectric layer to a thickness less than or equal to approximately 25% of the combined thickness of the outer dielectric layer and the inner dielectric layer.

16. An attrition-resistant, flexible, insulated wire well-suited for use in high temperature operating environments, the insulated wire comprising:

an elongated conductor; and an insulative coating disposed over the elongated conductor, the insulative coating formulated from a dielectric material, an inorganic lubricant, and an organic binder comprising an oxygenated polyolefin;

wherein the organic binder has been substantially decomposed from the insulative coating during manufacture of the insulated wire;

wherein the inorganic lubricant comprises boron nitride; and wherein the inorganic lubricant is concentrated in an outer annular portion of the insulative coating.

* * * * *